United States Patent
Ho

(10) Patent No.: US 6,674,601 B1
(45) Date of Patent: Jan. 6, 2004

(54) METHOD AND APPARATUS FOR ELECTRONICALLY SHIFTING MECHANICAL RESONANCE OF AN ACTUATOR SYSTEM OF A DISC DRIVE

(75) Inventor: Hai Thanh Ho, Westminster, CO (US)

(73) Assignee: Seagate Technology LLC, Scotts Valley, CA (US)

(*) Notice: Subject to any disclaimer, the term of this patent is extended or adjusted under 35 U.S.C. 154(b) by 525 days.

(21) Appl. No.: 09/591,770

(22) Filed: Jun. 12, 2000

Related U.S. Application Data

(60) Provisional application No. 60/158,880, filed on Oct. 12, 1999.

(51) Int. Cl.[7] .............................................. G11B 21/02
(52) U.S. Cl. ....................................................... 360/75
(58) Field of Search ................................ 360/75, 77.02, 360/78.04, 78.09, 65, 46; 318/561

(56) References Cited

U.S. PATENT DOCUMENTS

| | | | | |
|---|---|---|---|---|
| 4,683,431 A | | 7/1987 | Pattany et al. ............... 324/306 |
| 4,720,679 A | | 1/1988 | Patrick et al. ............... 324/309 |
| 4,728,890 A | | 3/1988 | Pattany et al. ............... 324/309 |
| 4,771,242 A | | 9/1988 | Lampman et al. ........... 324/309 |
| 4,924,976 A | | 5/1990 | Bernett ........................ 188/378 |
| 5,032,776 A | * | 7/1991 | Garagnon .................... 318/611 |
| 5,115,363 A | | 5/1992 | Khan et al. .................. 360/104 |
| 5,224,026 A | | 6/1993 | Okayama ...................... 363/21 |
| 5,229,896 A | | 7/1993 | Tohyama et al. ......... 360/78.07 |
| 5,245,283 A | | 9/1993 | Provost et al. ............... 324/309 |
| 5,325,247 A | * | 6/1994 | Ehrlich et al. ............ 360/78.09 |
| 5,587,657 A | | 12/1996 | Kanazawa .................... 324/309 |
| 5,594,849 A | | 1/1997 | Kuc et al. ..................... 395/135 |
| 5,955,799 A | | 9/1999 | Amaya et al. ................. 310/36 |
| 6,014,285 A | * | 1/2000 | Okamura .................. 360/78.04 |
| 6,219,196 B1 | * | 4/2001 | Semba et al. .................. 360/75 |
| 6,246,536 B1 | * | 6/2001 | Galloway ................. 360/78.04 |
| 6,417,982 B1 | * | 7/2002 | Ottesen et al. ............ 360/77.02 |

\* cited by examiner

*Primary Examiner*—David Hudspeth
*Assistant Examiner*—Fred F. Tzeng
(74) *Attorney, Agent, or Firm*—Westman, Champlin & Kelly P.A.

(57) ABSTRACT

A disc drive actuator system includes an equalizer filter coupled between the controller and actuator plant of a disc drive actuator system. The filter applies a gain of less than unity gain to the actuator drive signals from the controller at the resonance frequency of the plant, and applies a gain greater than unity to the actuator drive signals at a selected frequency different from the plant resonance frequency to derive a system resonance frequency shifted from the plant resonance frequency. In one form the equalizer filter functions as a notch filter to attenuate signals at the plant resonance frequency, and functions as a peak filter to boost the gain of higher frequency signals over a band wide enough to ensure zero phase loss below the plant resonance frequency.

18 Claims, 3 Drawing Sheets

METHOD AND APPARATUS FOR ELECTRONICALLY SHIFTING MECHANICAL RESONANCE OF AN ACTUATOR SYSTEM OF A DISC DRIVE

CROSS-REFERENCE TO RELATED APPLICATION

This application claims priority of Provisional Application No. 60/158,880, filed Oct. 12, 1999, for "METHOD TO ELECTRONICALLY SHIFT RESONANCE TO HIGHER FREQUENCY AND/OR MARGINS" by Hai T. Ho.

FIELD OF THE INVENTION

This invention relates to disc drives, and particularly to improving servo bandwidths and margins of disc drives by shifting the mechanical resonance of the actuator system of the disc drive to a frequency that does not interfere with servo bandwidth and/or margins.

BACKGROUND OF THE INVENTION

Disc drives are employed in computer systems for the storage and retrieval of data. Typically, a disc drive includes one or more rotating discs to which data are written and from which data are read, together with a transducing head that reads data from and/or writes data to concentric tracks on the rotating disc. Typically, the head is mounted to an arm arranged to move substantially radially across the disc to write data to and read data from the disc. An actuator assembly is operable to move the head adjacent the surface of the disc to confront various ones of the concentric tracks on the disc surface.

In a magnetic disc drive, for example, a read/write head assembly is mounted adjacent the end of an actuator arm and is moved substantially radially adjacent the surface of the disc drive of the disc to confront selected concentric tracks on the disc. The write portion of the head assembly includes an inductive head that receives information signals through a coil to generate a magnetic flux that affects orientation of magnetic domains in the recording disc. The read portion of the head is sensitive to changing magnetic fields as the head passes the magnetic domains on the rotating disc. Similarly, an optical disc drive employs an actuator assembly to position an optical head adjacent selected tracks on optical discs, such as CD-ROMs.

There may be any number of disc surfaces to which data are written and from which data are read. In a magnetic disc drive, each disc includes two oppositely disposed disc surfaces, each confronted by a read/write head.

The actuator assembly comprises an E-block pivotally mounted adjacent the rotating discs. A voice coil motor operates the E-block to rotate about its pivot axis. The E-block includes extended actuator arms, with the heads mounted to the distal ends such that the heads move in an arcuate path generally radially across the disc between an outer track diameter and an inner track diameter. The actuator arms are cantilevered from the main body of the E-block and support the heads to aerodynamically "fly" a small distance from the surface of the disc.

During a seek operation, the voice coil motor operates the E-block through acceleration and deceleration cycles to move the head between selected tracks. The acceleration and deceleration of the cantilevered arms, and the impulses associated with the changes of acceleration or deceleration, introduce vibration to the arms which is transmitted through the E-block to the remainder of the disc drive structure. The vibration has a resonance frequency based upon the mechanical structure and characteristics of the actuator assembly. For example, the resonance frequency of the actuator assembly of a disc drive might be about 3.5 to 3.7 KiloHertz (KHz). Often the resonance frequency is such as to adversely interfere with the servo bandwidth and/or margins of the disc drive.

Various attempts have been made to minimize or correct for adverse resonance frequencies of the actuator assembly of the disc drive. For example, vibration absorbers, tuned to the resonance frequency of the actuator assembly, are often employed to dampen the resonance frequency, thereby minimizing vibration effect. However, the resonance frequency of an actuator assembly changes as the operating temperature of the disc drive changes. Consequently, mechanical vibration absorbers tuned to a resonance frequency might operate at a given operating temperature (or small range thereof), but not at another. Burnett, in U.S. Pat. No. 4,924,976, proposed an array of such vibration dampers, each tuned to a slightly different frequency, to accommodate the changing resonance frequency of the actuator assembly due to temperature. This approach, however, simply adds to the weight and bulk of the disc drive, sacrificing precious real estate within the disc drive housing that can be used for other, more useful purposes. The present invention addresses these and other problems, and offers other advantages over the prior art.

SUMMARY OF THE INVENTION

A disc drive actuator system according to the present invention includes a controller, an actuator plant having a resonance frequency, and a filter. The controller supplies actuator drive signals to the filter which provides a gain of less than unity to the actuator drive signals at the plant resonance frequency and provides a gain greater than unity to the actuator drive signals at a selected frequency different from the plant resonance frequency. The filter thus establishes a system resonance frequency different from the plant resonance frequency by an amount based on the selected frequency.

The actuator plant includes a movable actuator arm supporting a transducer relative to the disc surface, and a motor responsive to drive signals to move the actuator arm to thereby move the transducer relative to the disc surface. The filter comprises an equalizer filter coupled between the controller and the motor for receiving drive signals from the controller and providing filtered drive signals to the motor.

In one form of the invention, the equalizer filter includes a notch filter tuned to the plant resonance frequency to attenuate signals at the plant resonance frequency, and a gain boost at frequencies above the plant resonance frequency to force a system resonance frequency higher than the plant resonance frequency. The gain boost introduces zero or near zero phase loss, resulting in greater gain and phase margins and improved error transfer function responses.

DETAILED DESCRIPTION OF ILLUSTRATIVE EMBODIMENTS

Figure 1:
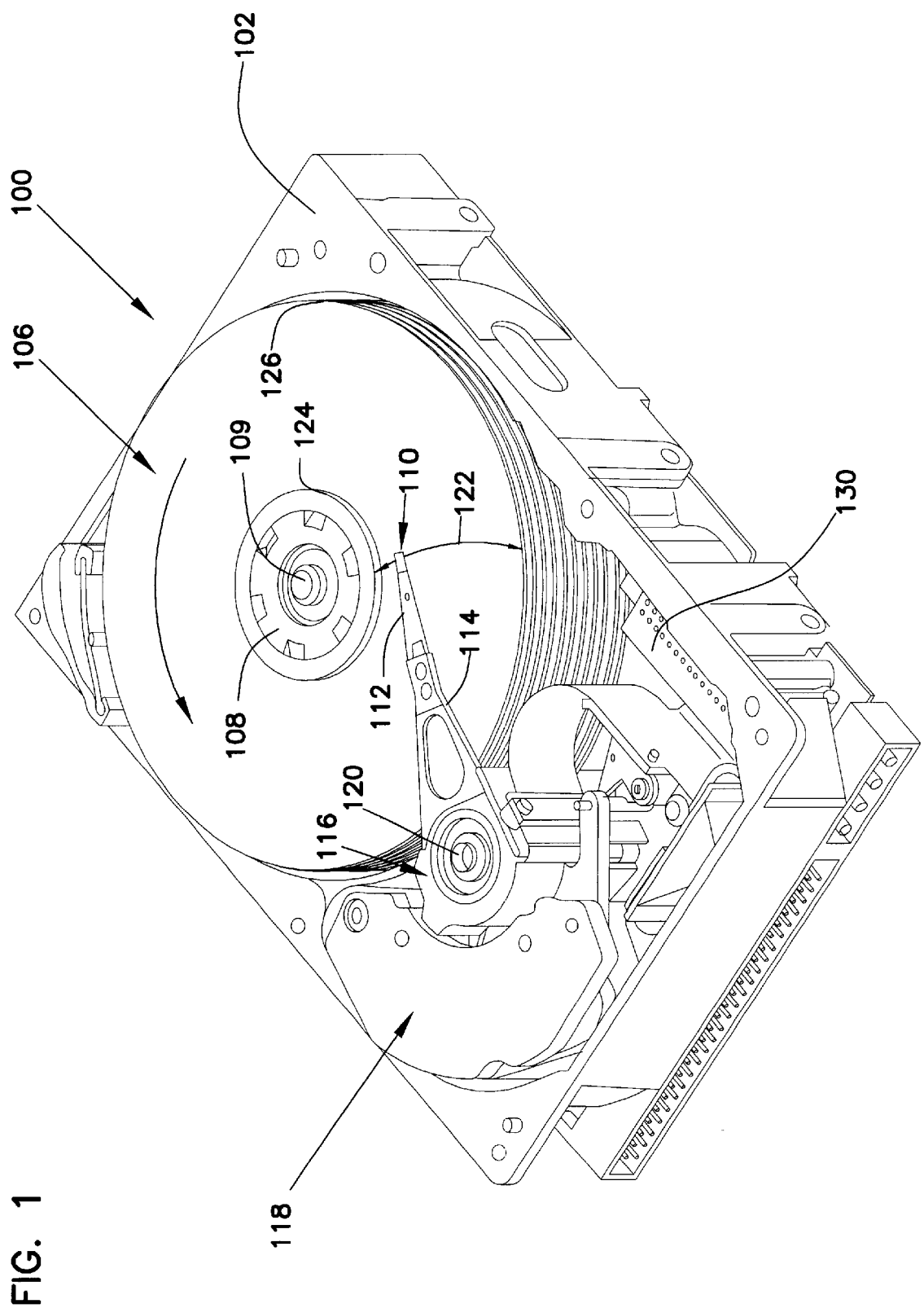
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated disc head-slider 110 that is mounted to disc drive 100 for communication with the confronting disc surface. Head-slider 110 includes a slider structure arranged to aerodynamically fly above the associated disc surface of an individual disc of disc pack 106, and a transducing head arranged to write data to, and read data from, concentric tracks on the confronting disc surface. In the example shown in FIG. 1, head-sliders 110 are supported by suspensions 112 which are in turn attached to track accessing arms 114 of an actuator E-block 116. Actuator 116 is driven by a voice coil motor (VCM) 118 to rotate the E-block, its actuator arms and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics in the form of a controller included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
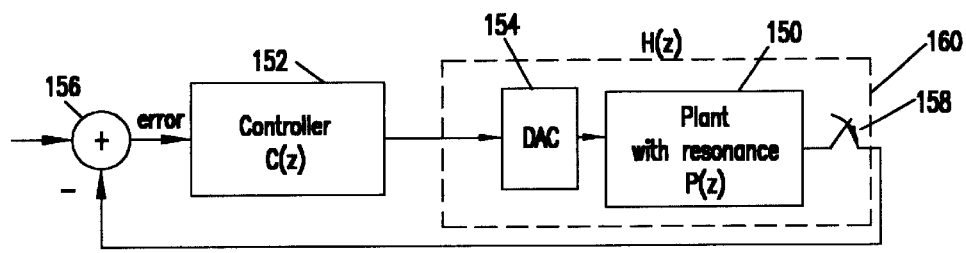
FIG. 2 is a block diagram of an electrical equivalent of the actuator plant of a typical disc drive.

FIG. 2 is a block diagram illustrating the equivalent circuit of the actuator system of a typical disc drive 100. The system includes an actuator plant 150 that includes voice coil motor 118, E-block 116 (together with the E-block actuator arms 114), suspensions 112 and heads 110. The voice coil motor 118 of plant 150 is operated by a controller 152 that operates digital-to-analog converter 154 to supply analog signals to drive motor 118. In the track-following mode of the disc drive, the heads of plant 150 are connected through a summing mechanism 156 to provide a drive signal to controller 152. Hence, when in the track following operation, switch 158 is logically closed to provide error signals to the controller from the heads of plant 150. Typically, summing device 156 includes a second input from the main computer (not shown) to operate controller 152 in a seek operation.

The transfer function of plant 150 and converter 154 exhibits resonant frequencies based on various electrical and mechanical responses of the actuator system. For example, during a track follow operation, controller 152 receives track error position signals from plant 150 and provides correction signals to converter 145 to supply a drive signal to the voice coil motor 118 of plant 150. Voice coil motor 118 operates E-block 116 to correct the position of head 110 in relation to the track being followed on the confronting disc. More particularly, the drive signal applied to voice coil motor 118 accelerates the heads from zero velocity to a high velocity. The forces associated with the acceleration, when transmitted through the suspension and slider mechanism of the plant, generate complex vibration responses within the disc drive. Certain of these responses are in the vicinity of about 3.5 KHz, likely to interfere with the servo bandwidth and margins of the controller 152 performing the track follow operation.

Figure 3:
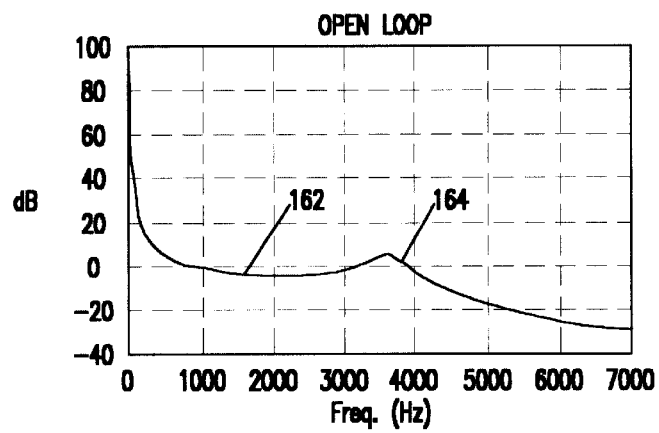
FIG. 3 is a waveform illustrating the open loop response of the actuator plant diagramed in FIG. 2.

FIG. 3 illustrates the frequency response of the circuit illustrated in FIG. 2. As shown in the waveform 162, the response shows a peak 164 at about 3,600 Hertz, indicating a resonance frequency of the plant 150.

Figure 4:
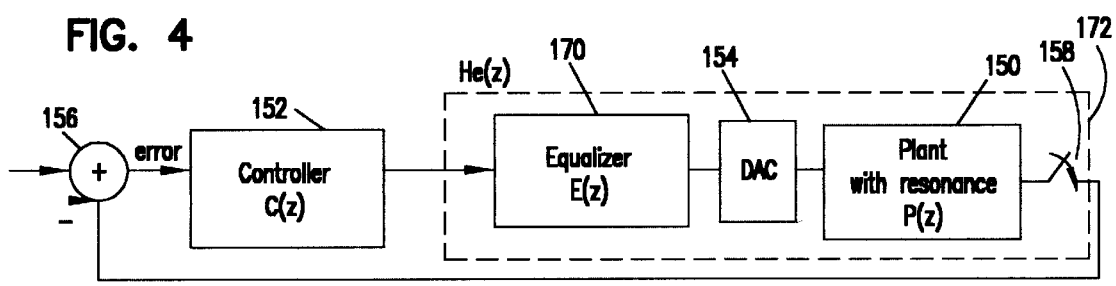
FIG. 4 is a block diagram of an electrical equivalent of the actuator plant according the present invention.
Figure 5:
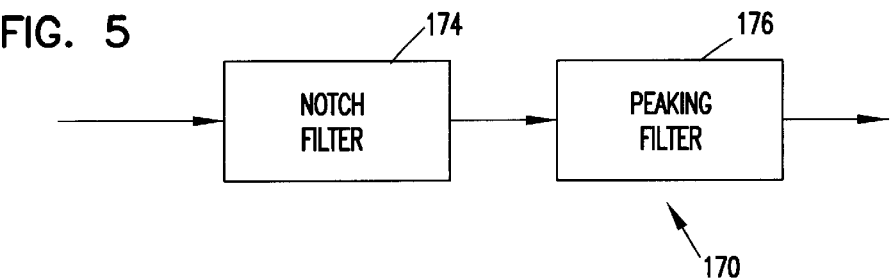
FIG. 5 is a block diagram of an equalizer filter used in one form of the present invention.

The present invention, illustrated in FIG. 4, employs an equalizer filter 170 such that actuator system 172 includes plant 150, digital-to-analog converter 154 and equalizer 170. Equalizer filter 170 is a filter placed in cascade with the controller between controller 152 and converter 154. In one form of the invention, equalizer filter 170 is a digital filter implemented in firmware to perform the functions illustrated in FIG. 5. The equalizer filter performs two basic functions. First, equalizer filter 170 operates as a notch filter function 174 tuned to the resonance frequency of plant 150 to attenuate signals over a narrow band centered on the plant resonance frequency. Second, equalizer filter 170 performs as a gain boost 176 that provides to boost the gain centered at a selected frequency above the notch frequency over a frequency band wide enough to ensure a zero phase loss at operating frequencies below the notch frequency. The notch filter function serves to attenuate actuator drive signals from controller 150 at the resonance frequency of plant 150 to pass signals above that resonance frequency. The gain boost function serves to increase signal strength over the band of the gain or peak filter function centered above the selected frequency that is above the plant resonance frequency. The gain boost eliminates phase loss ordinarily associated with notch filters, thereby improving gain and phase margins and improving error transfer function responses. In the example given in association with FIGS. 6 and 7, equalizer filter 170 attenuates signals centered about 3.6 KHz by providing a gain less than unity at 3.6 KHz and boosts the gain above the resonance frequency by providing a gain greater than unity above 3.8 KHz. The equalizer filter has a complex transfer function, E(z), represented by a general transfer function:

$$E(z) = \frac{a_o + a_1 z^{-1} + \ldots + a_n z^{-n}}{b_o + b_1 z^{-1} + \ldots + b_n z^{-n}}.$$

While the present invention is preferably implemented in the form of a digital filter encoded as firmware in the disc drive controller 152, the invention might also be implemented in an analog version employing an analog notch filter serially connected to a gain amplifier or peaking filter.

Figure 6:
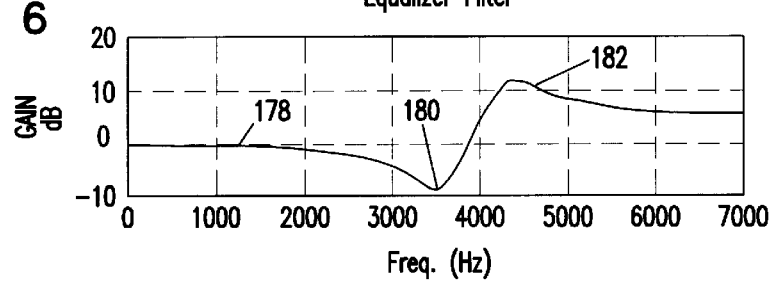
FIGS. 6 and 7 are waveforms illustrating the response and phase shift of a filter employed in the actuator plant illustrated in FIG. 4.

As shown in FIG. 6, portion 178 of the gain waveform illustrates that equalizer filter 170 provides a substantially unitary response below the notch frequency, which is equal to the plant resonance frequency. At the notch frequency 180 (and for a suitable frequency band surrounding the notch frequency) equalizer filter 170 provides a gain less than unity so that the net magnitude response at the resonance frequency of the system is flat, or even reduced. The gain boost provided by equalizer filter 170 results in a gain greater than unity above the notch frequency and results in a peak in the magnitude response at 182. The frequency of peak 182 is a system resonance frequency based on the open-loop transfer function of the system, $$L(z)=C(z)E(z)D(z)P(z),$$

where C(z) is the transfer function of controller 152, E(z) is the transfer function of filter 170, D(z) is the transfer function of converter 154, P(z) is the transfer function of plant 150 and L(z) is the transfer function of the entire actuator system consisting of controller 152, equalizer filter 170, converter 154 and plant 150. The equalizer filter establishes a gain less than unity at the resonance frequency of the plant, and greater than unity at a selected frequency that does not interfere with servo bandwidths, resulting in greater gain and phase margin, providing better error transfer functions.

Figure 7:
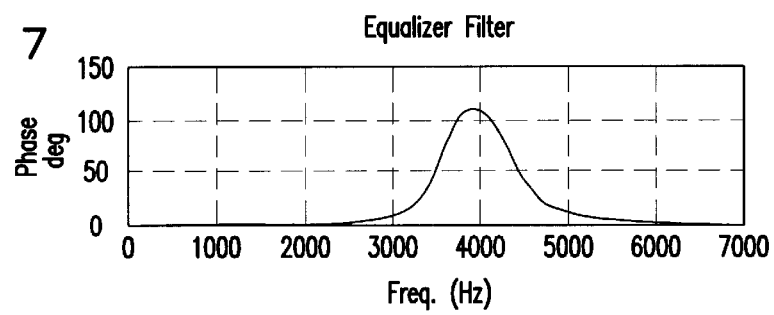

The attenuation, or gain less than unity, provided by notch filter function 174 need only be great enough to establish a substantially flat or even slightly reduced magnitude response of the actuator system through the plant resonance frequency. The peaking filter function 176 provides a gain boost that is great enough and wide enough to shift the system resonance frequency to a higher frequency and produce a positive or zero phase response over the operating frequency spectrum below the notch frequency. While the frequency response of the system is illustrated in FIG. 6 as having a peak 182 representing a selected system resonance frequency, the response may be substantially flat at frequencies above peak 182. As shown in FIG. 6, the notch filter function of equalizer filter 170 is tuned to the resonance frequency of plant 150 and peaking filter function of the equalizer filter boosts the gain above the notch filter frequency, forming a peak in the gain at about 4.2 KHz. As illustrated in FIG. 7, the gain boost has adequate bandwidth above the notch frequency to introduce a zero phase loss below the notch frequency.

Figure 8:
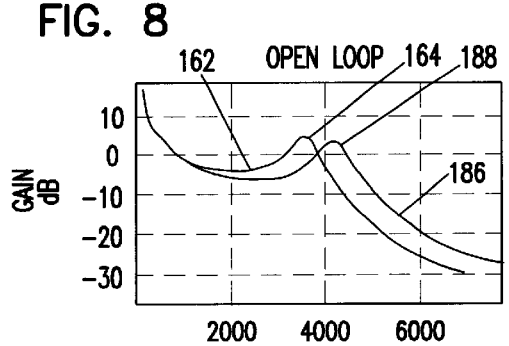
FIGS. 8–10 are waveforms comparing the open loop gain, error loop gain and phase error of the plant illustrated in FIG. 4.
Figure 10:
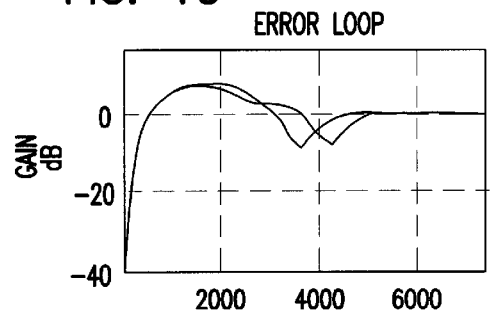
Figure 9:
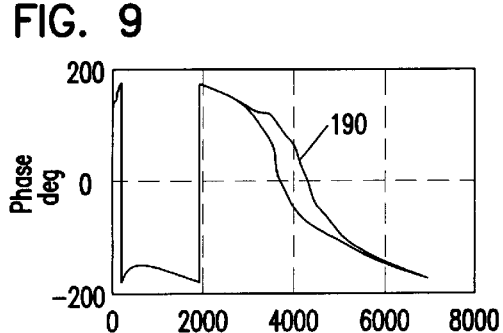

FIGS. 8–10 compare the response of the circuit including the equalizer filter to the same circuit without the equalizer filter. Thus, open loop response, illustrated in FIG. 8, is improved from waveform 162 to waveform 186 by the presence of the equalizer filter. More particularly, waveform 162 of FIG. 3, which reproduced in FIG. 8 for comparison, produces a peak without equalizer filter 170 at about 3.6 KHz. With the filter, peak 188 of waveform 186 is shifted to about 4.2 KHz. FIG. 9 illustrates the effect on phase shift due to the equalizer filter. Thus, waveform 190 illustrates the improved phase margin between 3 and 5 KHz achieved by the actuator system of FIG. 4 that includes equalizer filter 170, as compared to waveform 192 achieved by the actuator system of FIG. 2. Similarly, FIG. 10 illustrates the tracking error loop response, demonstrating the resonance frequency of the actuator system is shifted from about 3.6 (waveform 192) to 4.2 KHz (waveform 194).

The present invention thus provides a disc drive 100 having a controller 152 on circuit board 130 that provides actuator drive signals. An actuator system 172 comprises an actuator plant 150 movable in response to actuator drive signals. The actuator plant has a resonance frequency. A filter 170 filters the actuator drive signals to form a system resonance frequency shifted from the plant resonance frequency. The filter is tuned to the plant resonance frequency to apply a gain less than unity to the actuator drive signals at the plant resonance frequency 180 and to apply a gain greater than unity to the actuator drive signals at a selected frequency 182 different from the plant resonance frequency. As a result, the system resonance frequency is shifted from the plant resonance frequency by an amount based on the selected frequency. In a preferred form of the invention, filter 170 is an equalizer filter coupled between the controller and the actuator plant. The equalizer filter attenuates signals over a notch band centered at the plant resonance frequency, and boosts signals at a frequency above the plant resonance frequency over a band having a width to ensure zero phase loss at frequencies below the plant resonance frequency.

The present invention also provides a process for setting a system resonance frequency for an actuator system 110, 112, 114, 116 of a disc drive 100. The process comprises steps of (a) filtering (at notch filter function 174) the drive signals to attenuate signals at the plant resonance frequency 164, 180, and (b) applying a gain (with gain boost function 176) to boost signals at a frequency above the plant resonance frequency over a band having a width to ensure zero phase loss at frequencies below the plant resonance frequency.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the equalizer filter while maintaining substantially the same functionality without departing from the scope and spirit of the present invention. In addition, although the preferred embodiment described herein is directed to an equalizer filter operating in a digital mode, it will be appreciated by those skilled in the art that the teachings of the present invention can be applied to systems operating in an analog mode. More particularly, an equalizer filter operating in the analog mode may be placed after the digital-to-analog converter to operate in the analog mode rather than the digital mode described, without departing from the scope and spirit of the present invention.

What is claimed is:

1. A disc drive including:
   a controller providing actuator drive signals; and
   an actuator system comprising:
      an actuator plant movable in response to actuator drive signals, the actuator plant having a resonance frequency, and
      a filter tuned to the plant resonance frequency to apply a gain less than unity to the actuator drive signals at the plant resonance frequency and to apply a gain greater than unity to the actuator drive signals at a selected frequency different from the plant resonance frequency, whereby the system resonance frequency is shifted from the plant resonance frequency by an amount based on the selected frequency.

2. The disc drive according to claim 1, including a storage disc having a disc surface, and wherein the actuator plant includes:
   a movable actuator arm supporting a transducer relative to the disc surface, and
   a motor responsive to drive signals to move the actuator arm to thereby move the transducer relative to the disc surface.

3. The disc drive according to claim 2, wherein the filter comprises an equalizer filter coupled between the controller and the motor for receiving drive signals from the controller and providing filtered drive signals to the motor.

4. The disc drive of claim 3, wherein the equalizer filter is so designed and arranged as to
   attenuate signals over a notch band centered at the plant resonance frequency, and
   boost signals at a frequency shifted from the plant resonance frequency over a band having a width to ensure zero phase loss at frequencies below the plant resonance frequency.

5. The disc drive of claim 3, including:
   a digital-to-analog converter coupled to the controller and responsive to digital drive signals from the controller to provide analog drive signals, the equalizer filter being coupled between the converter and the motor.

6. The disc drive of claim 5, wherein the equalizer filter is so designed and arranged as to
   attenuate signals over a notch band centered at the plant resonance frequency, and boost signals at a frequency shifted from the plant resonance frequency over a band having a width to ensure zero phase loss at frequencies below the plant resonance frequency.

7. The disc drive of claim 3, wherein the filter comprises:

a notch filter tuned to the system resonance frequency to attenuate signals at the system resonance frequency, and a peak filter tuned to the selected frequency to amplify signals at the selected frequency.

8. The disc drive of claim 7, wherein the selected frequency is above the plant resonance frequency and the peak filter amplifies signals centered at the selected frequency over a band having a width designed for zero phase loss at frequencies below the plant resonance frequency.

9. The disc drive according to claim 1, wherein the filter comprises an equalizer filter coupled between the controller and the actuator plant for receiving drive signals from the controller and providing filtered drive signals to the actuator plant.

10. The disc drive of claim 9, wherein the equalizer filter is so designed and arranged as to attenuate signals over a notch band centered at the plant resonance frequency, and boost signals at a frequency shifted from the plant resonance frequency over a band having a width to ensure zero phase loss at frequencies below the plant resonance frequency.

11. The disc drive of claim 9, including:

a digital-to-analog converter coupled to the controller and responsive to digital drive signals from the controller to provide analog drive signals, the equalizer filter being coupled between the converter and the actuator plant.

12. The disc drive of claim 11, wherein the equalizer filter is so designed and arranged as to attenuate signals over a notch band centered at the plant resonance frequency, and boost signals at a frequency shifted from the plant resonance frequency over a band having a width to ensure zero phase loss at frequencies below the plant resonance frequency.

13. The disc drive of claim 1, wherein the filter comprises:

a notch filter tuned to the system resonance frequency to attenuate signals at the system resonance frequency, and a peak filter tuned to the selected frequency to amplify signals at the selected frequency.

14. The disc drive of claim 13, wherein the selected frequency is above the plant resonance frequency and the peak filter amplifies signals centered at the selected frequency over a band having a width designed for zero phase loss at frequencies below the plant resonance frequency.

15. A process for setting a system resonance frequency for an actuator system having an actuator plant responsive to drive signals, the actuator plant having a plant resonance frequency, the process including steps of:

(a) filtering the drive signals to attenuate signals at the plant resonance frequency, and (b) applying a gain greater than unity to the drive signals at a frequency other than the plant resonance frequency.

16. The process of claim 15, wherein step (a) includes:

(c) applying a gain less than unity to the drive signals at the plant resonance frequency.

17. The process of claim 15, wherein step (a) includes:

(c) attenuating signals over a notch band centered at the plant resonance frequency, and (d) boosting signals centered at frequency above the plant resonance frequency over a band having a width to ensure zero phase loss at frequencies below the plant resonance frequency.

18. An actuator system including:

an actuator plant having a resonance frequency, the actuator plant being movable in response to actuator drive signals; and an equalizer having an output to provide signals to the actuator plant to establish a system resonance frequency shifted from the plant resonance frequency.

\* \* \* \* \*